Jan. 26, 1954 W. F. AUERBACHER ET AL 2,667,581

TUNING DEVICE FOR SIGNAL RECEIVERS

Filed Sept. 21, 1951 4 Sheets-Sheet 1

INVENTOR.
Werner F Auerbacher
BY Seymour Napolin

ATTORNEY

INVENTOR.
Werner F. Auerbacher
BY Seymour Napoleon
Darby & Darby
their ATTORNEY

TUNING DEVICE FOR SIGNAL RECEIVERS

Filed Sept. 21, 1951 4 Sheets-Sheet 3

INVENTOR.
Werner F. Auerbacher
Seymour Napoler
BY
their ATTORNEY

Jan. 26, 1954 W. F. AUERBACHER ET AL 2,667,581

TUNING DEVICE FOR SIGNAL RECEIVERS

Filed Sept. 21, 1951 4 Sheets-Sheet 4

INVENTOR.
Werner F Auerbacher
Seymour Kapper
BY David ...
Their ATTORNEY

Patented Jan. 26, 1954

2,667,581

UNITED STATES PATENT OFFICE 2,667,581

TUNING DEVICE FOR SIGNAL RECEIVERS

Werner F. Auerbacher, Bronx, and Seymour Napolin, Willison Park, N. Y., assignors to Pilot Radio Corporation, Long Island City, N. Y., a corporation of New York Application September 21, 1951, Serial No. 247,656

14 Claims. (Cl. 250—40)

This invention relates to tuners for signal receivers and more particularly, to a novel, simplified relatively inexpensive and easily operable continuous tuner adaptable to operation on either A.-M. or F.-M. reception and over a wide frequency range, including U. H. F. The invention tuner is particularly adaptable to television receivers, although its application is not limited thereto.

Television receivers are usually either pretuned or automatically tuned to receive signals on a limited number of frequencies within two bands, one band ranging from 54–80 mc. and the other from 174–216 mc. The first band has six channels therein, of which only five are presently used, and the second band has seven channels therein. The channels in the lower band are numbered from 2 to 6, and those in the upper band are numbered from 7 to 13.

The usual type of tuner or channel selector is the so-called lumped impedance type in which a predetermined number of substantially fixed impedances are selectively connectible into the receiver circuits by wiper switch arms advanced over contacts between which the impedances are connected.

These lumped impedance tuners are difficult to manipulate and, for best reception, require an associated "fine tuner" to achieve sharply selective reception. In addition, a throw-over switch is required to change from one band of channels to the other, this throw-over switch requiring manipulation in addition to manipulation of the channel selector. The making and breaking of switch contacts under operating potentials results in deterioration of the contacts and presents a maintenance problem.

Receivers of the type to which the invention tuner is applicable include an R. F. amplifier stage, an oscillator, and a mixer. The incoming signals are amplified in the R. F. stage and combined, in the mixer, with the local frequency generated in the oscillator to produce the signal modulated intermediate frequency fed to the demodulation stage of the receiver.

The tuners for such receivers must be so designed that the tuning components for the R. F. amplifier stage, the oscillator, and the mixer are properly ganged together for conjoint tuning, in order to develop the required intermediate frequency. This ganging introduces numerous problems when it is desired to provide a tuner operable over not only the entire present television reception bands but also with ultra-high frequency reception. The problems are further accentuated when it is attempted to provide continuous tuning, without manual switching, in either direction over both of the present reception bands.

The foregoing difficulties preclude the use of conventional tuning condensers, band switches, and the like for a universally adaptable tuner. In addition, other conventional tuning components and arrangements are inapplicable due to difficulty in or impossibility of shielding, inadaptability to ultra-high frequency reception, mechanical difficulties in number and size of parts and proper ganging, and other factors.

The present invention is directed to a novel, simple tuner in which the foregoing difficulties are avoided and continuous tuning over both bands in either direction, plus easy adaptability to ultra-high frequency, are provided. The basic element of the invention tuner is what may be termed a "slug tuned" condenser. This condenser comprises a dielectric tube having two or more axially spaced conductive surfaces plated or otherwise provided on its outer surface, and forming spaced condenser "plates." The condenser coupling is provided by one or more conductive slugs mounted for axial movement within the dielectric tube and cooperating with the external condenser "plates" to provide a series connected condenser arrangement. The usual trimmer condensers and adjustable padder coils or inductances are mounted on the tube exterior to provide a complete individual tuning unit.

A novel operating mechanism is provided to properly gang a number of such units for conjoint operation to coordinately tune the R. F. amplifier stage, oscillator, and mixer. To this end, a tuner chassis is provided comprising a pair of uprights interconnected by a longitudinal shelf intermediate the ends of the uprights. The individual tuning units are mounted in alignment in two transversely spaced groups along the underside of the shelf, each unit being aligned with an opening in the shelf. Novel means are provided for quickly and detachably securing each unit in position.

The upper edges of the uprights have slots therein, in alignment with each other, receiving a shaft having a pair of drums on its ends and adjacent the uprights. A flexible band is secured, intermediate its ends, to the periphery of each drum. The ends of each band are interconnected by a tension member or spring trained over pulleys mounted on each upright. A pair of relatively rigid beams, of an aluminum angle, channel, or the like, extend longitudinally of the shelf each in alignment with a group of tuning units. Each beam is fixedly connected at its ends to an end of a flexible band, so that the beams are reversely raised and lowered as the drums are rotated.

The "slugs" of the tuning units are adjustably connected to the beams so that, as the beams are raised and lowered, the slugs are moved axially of the dielectric tubes to vary the capacities of the tuning units.

Operation of the beams is effected by a selector knob mounted on the "front" upright and having a shaft extending therethrough and carrying a cam on its inner end. This cam is of substantially smaller diameter than the adjacent drum, and has a link eccentrically pivoted thereto and pivotally connected to a relatively long radial arm connected to the drum shaft. As the cam is rotated by the selector knob, the arm is oscillated to correspondingly raise and lower the beams.

The cam has the additional function of operating a reception band change-over switch which controls the connection of the antenna and B+ to the two tuning sections, each designed for tuning over one band. This switch is mounted beneath the shelf and has an operator projecting upwardly from the shelf to engage the cam. When the control knob is moved from channel 2 to channel 13, or from channel 6 to channel 7, or vice versa, the switch is appropriately operated to switch the bands involved. The shelf further acts as a support for the valves or tubes, transformers, and other components of the R. F. amplifier stage, oscillator, and mixer, thus providing a completely self-contained "front end" for a television receiver.

For an understanding of the invention principles, reference is made to the following detailed description of a typical embodiment thereof as illustrated in the accompanying drawings. In the drawings.

Figure 1:
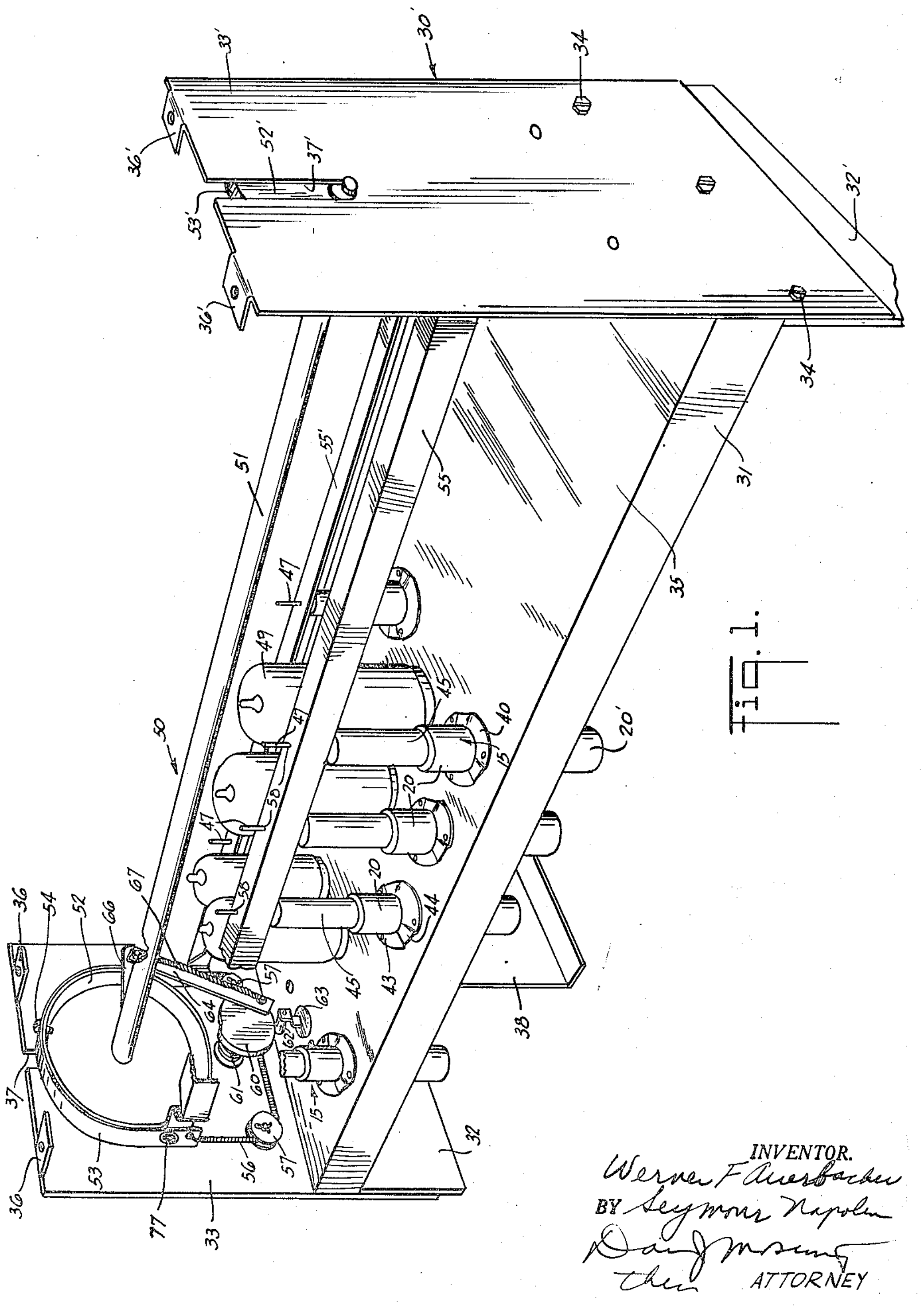
Fig. 1 is a perspective view of the upper side of the tuner illustrating the ganging arrangement and drive for the individual units thereof.
Figure 2:
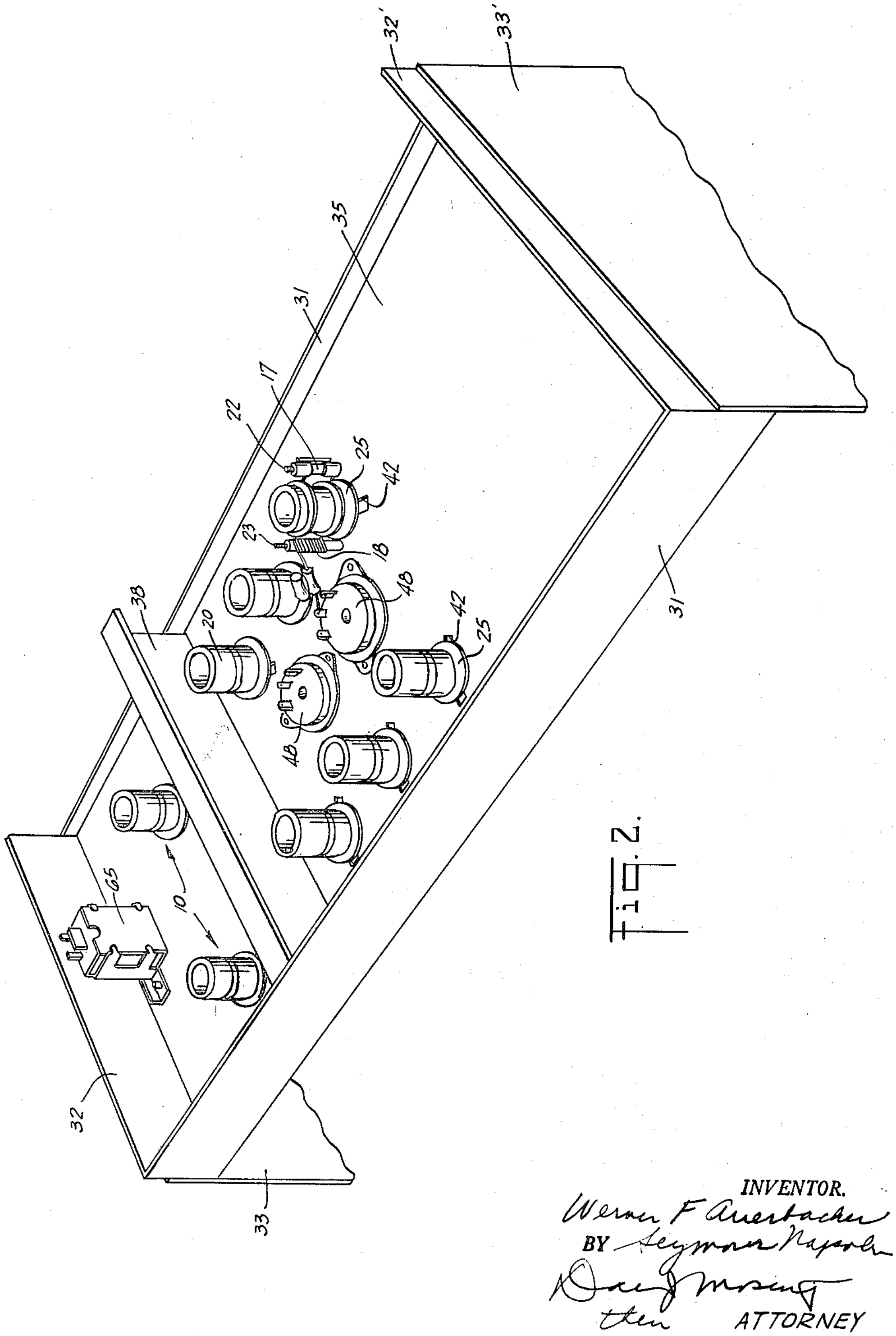
Fig. 2 is a partial perspective view of the tuner, in inverted position, showing the underside of the unit.
Figure 3:
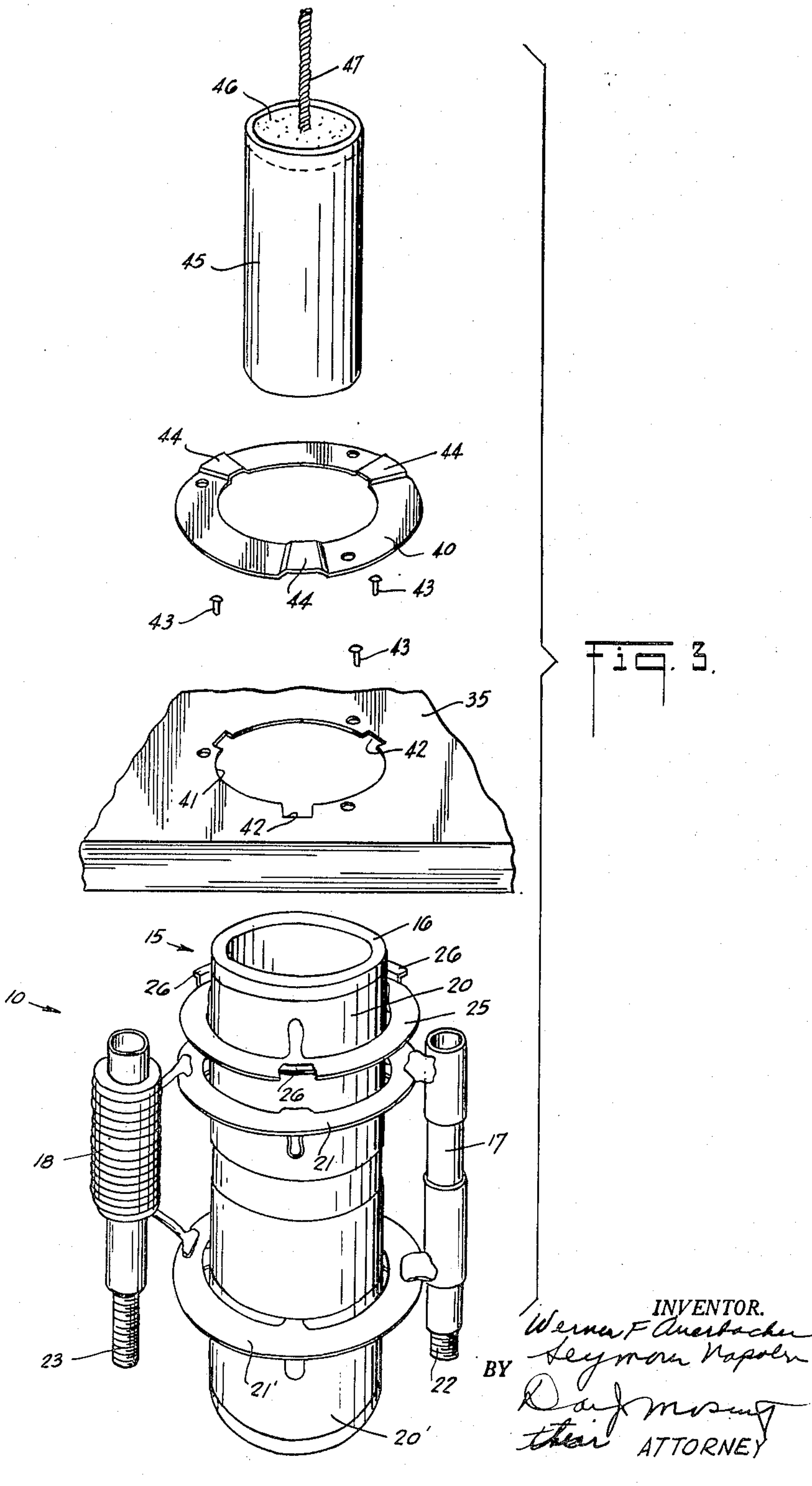
Fig. 3 is an exploded view of the invention tuning unit, illustrating the associated chassis portion and mounting arrangement for the unit.

Referring to Figs. 1, 2 and 3 of the drawings, each tuning unit 10 includes a condenser 15 comprising an elongated tube 16 of dielectric material such as glass, synthetic resin, fiberboard and the like. In the particular embodiment shown, tube 16 has plated or otherwise affixed on its exterior surface, in axially spaced relation to each other, a pair of conductive metal cylinders or sleeves 20 and 20′. Sleeves 20 and 20′ may have appropriate areas and contours to attain the desired capacity and capacity variation characteristics.

A mounting ring 25 is soldered or brazed to sleeve 20, and formed with offset radial ears 26 at peripherally spaced locations, three ears with a 120° spacing being illustrated. A trimmer condenser 17 and a coil or inductance 18 are mounted on condenser 15 by virtue of having their terminals soldered or brazed to metal rings 21, 21′ soldered or brazed to sleeves 20 and 20′, respectively. Trimmer condenser 17 has the usual adjustment screw 22 and coil 18 has the usual padder adjustment screw 23. The condenser 15 with connected trimmer condenser 17 and coil 18 forms a complete unit for mounting on the shelf 35 of a chassis 30.

Shelf 35 extends substantially horizontally, having side reinforcing flanges 31 and downturned ends 32, 32′ forming legs for the chassis. Each leg has a substantially flat upright plate 33, 33′ respectively secured thereto as by bolts or screws 34, and each upright has mounting ears 36, 36′. A central slot 37, 37′ extends inwardly from the upper end of each upright for a purpose to be described.

Shelf 35 has two transversely spaced groups of aligned holes or apertures 41, each of a size to receive freely a tuning unit 15. Each aperture has circumferentially spaced radial extensions 42 arranged to receive the ears 26 of ring 25. A flat annular tension spring 40, of bronze or similar material, is secured to chassis 35, by fasteners 43, in concentric bounding relation with each aperture 41, each spring 40 having offsets 44 aligned with extensions 42. To mount the tuning unit on shelf 35, the unit is inserted upwardly through an aperture 41 with ears 26 aligned with extensions 42 and offsets 44, until the ears engage the offsets. The unit is then rotated substantially 90° to lock the unit in place. Each condenser is completed by a cylindrical slug 45, of brass or other conductive metal, having a plug 46 of dielectric material, such as polyethylene, secured in its upper end. A flexible shaft 47 is secured to each plug 46 for moving slug 45 axially of condenser 15. Each tuning unit 10 comprises condenser 15, including slug 45, trimmer condenser 17 and coil 18.

Shelf 35 also has additional apertures to receive sockets 48 for electronic tubes, such as 49, comprising elements of the tuned stages of the receiver. The connections of units 10 to the other circuit components is made on the underside of shelf 35 as best seen in Fig. 3. A shield 38 is disposed between the R. F. amplifier stage and the other tuned stages.

The means for operating the tuning units in ganged relation is generally indicated at 50 in Fig. 2, and includes a longitudinal shaft 51 lying in slots 37, 37′ and fixedly carrying drums 52, 52′ adjacent each end and immediately next to uprights 33, 33′. A flexible strap 53, 53′ extends over the upper half of each drum, each strap being secured to a drum by a screw 54 or the like. The ends of each strap are interconnected by a tension element, such as a spring 56, this spring being trained over pulleys 57 on the uprights and so located that the strap ends move perpendicularly to shelf 35. The diameter of drums 52, 52′ is substantially equal to the center-to-center spacing of the two rows of units 10.

A pair of rigid lightweight beams 55, 55′ extends in parallel relation longitudinally of shelf 35, each beam being aligned with one row of tuning units. The beams may, for example, be aluminum channels or angles. The opposite ends of each beam are connected to corresponding ends of the two straps 53 and 53′, as indicated at 77. Hence, as drums 52, 52′ are oscillated, the beams are moved in opposed directions perpendicularly to shelf 34. The flexible shafts 47 of each slug 45 are adjustably secured to a beam by screwing into threaded holes 58 to provide for initial setting of the slugs in the condensers 15.

A control knob (not shown) is mounted on the front face of upright 33 and has channel indicia associated therewith. The shaft 61 of this knob extends inwardly from upright 33 and carries a cam 60 on its inner end. Cam 60 engages the operator 62 of a switch 65 mounted beneath shelf 35, the operator projecting upwardly through an aperture 63 in shelf 35. A link 64 is eccentrically pivoted to cam 60, and has its outer end pivotally connected to a radial arm 66 fixed to shaft 51. The radial eccentricity of link 64 on cam 60 is substantially less than the length of arm 66, so that rotation of the cam oscillates the arm 66 and shaft 51 to reciprocate beams 55, 55' perpendicularly relative to shelf 35. A spring 67 is provided to prevent back lash in the crank-link movement.

As the selector knob is moved from channel 2 to channel 13, or from channel 6 to channel 7, or vice versa, switch 65 is operated to switch the antenna and B+ connections to the tuning sections for the particular band of channels involved. It should be noted that the selector knob can be rotated continuously in either direction so that a change from channel 13 to channel 2 can be made without reversing the knob movement.

The described tuning units have the advantages of low minimum capacity, and compact construction with the coils and trimmers mounted directly on the condenser element to reduce lead losses. The slugs and sleeves can be easily shaped for proper tracking and range, and the hollow dielectric tube can be easily modified in wall thickness, contour, diameter and length. The elements of each unit can be arranged for minimum stray field conditions, and optimum operating capacity can be preselected with a maximum flexibility for small error correction.

The ganged operation means provides for straight line motion of the slugs with minimum back lash, while providing for continuous selector knob rotation in either direction. The dielectric plugs in each slug provide insulation between the condenser and the operating beams, so that the latter can be of metal for lighter weight with greater rigidity. These buttons or plugs prevent undesired coupling between the condensers and the operating mechanism.

Figure 4:
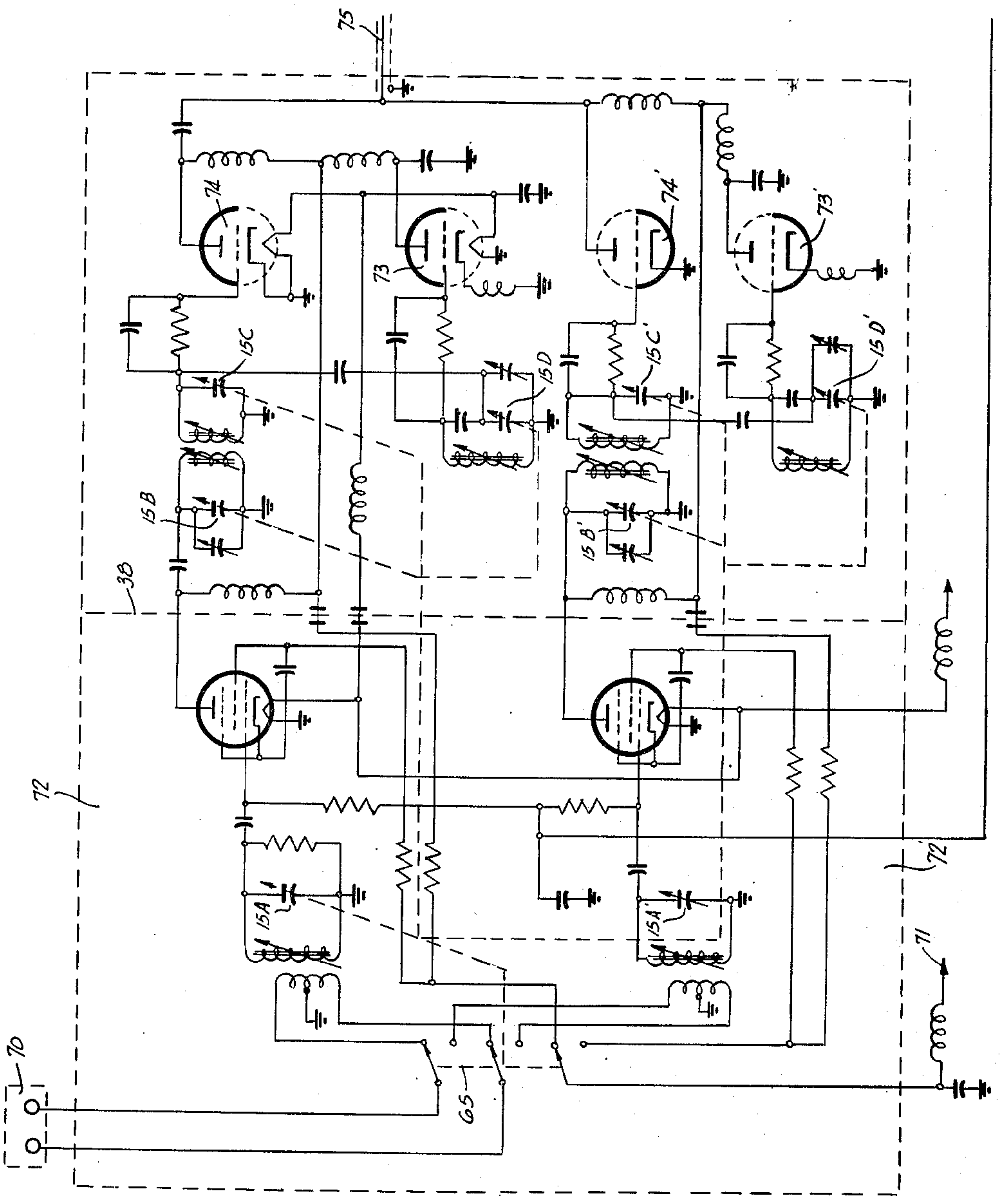
Fig. 4 is a schematic wiring diagram of the R. F. amplifier stage, oscillator, and mixer of a television receiver incorporating the invention tuner.

Fig. 4 represents a typical diagram of the tuned sections of a television receiver incorporating the invention tuner. The antenna 70 and B+ supply at 71 are connected to the double throw switch 65, which selectively connects the antenna and B+ to the R. F. amplifier stage 72, oscillator 73 and mixer 74 for channels 2 to 6, or to stage 72', oscillator 73' and mixer 74' for channels 7 to 13. Switch 65 is ganged for operation with condensers 15A, 15B, 15C and 15D, of the lower band, and condensers 15A', 15B', 15C' and 15D' of the upper band. The incoming signals are amplified in either R. F. stage, and fed to mixer 74 or 74'. Oscillators 73, 73' are tuned simultaneously with the R. F. stages and mixers to feed the proper local frequency to the mixers to produce the desired modulated intermediate frequency output at studded output line 75.

While a specific embodiment of the invention has been shown and described in detail to illustrate the invention principles, it will be understood that the invention may be embodied otherwise without departing from such principles.

What is claimed is:

1. A circuit tuning unit comprising, in combination, an elongated dielectric member, at least a pair of conductive metal surfaces arranged in longitudinallly spaced relation on one surface of said member, a conductive metal element mounted for relative movement longitudinally of said member adjacent the opposite surface of the latter, means operatively connected to said element and constructed and arranged to effect such relative longitudinal movement to vary the capacity of such unit, trimmer condenser means, and means mechanically and electrically connecting said condenser means to a pair of such spaced metal surfaces.

2. A circuit tuning unit comprising, in combination, an elongated dielectric member, at least a pair of conductive metal surfaces arranged in longitudinally spaced relation on one surface of said member, a conductive metal element mounted for relative movement longitudinally of said member adjacent the opposite surface of the latter, means operatively connected to said element and constructed and arranged to effect such relative longitudinal movement to vary the capacity of such unit, padder coil means, means mechanically and electrically connecting said coiled means to a pair of such spaced metal surfaces, trimmer condenser means, and means mechanically and electrically connecting said condenser means to a pair of such spaced metal surfaces.

3. A circuit tuning unit comprising, in combination, an elongated tubular dielectric member, at least a pair of tubular conductive metal surfaces arranged in longitudinally spaced relation on the outer surface of said member, a conductive metal element mounted for relative axial movement in said member, means operatively connected to said element and constructed and arranged to effect such relative axial movement to vary the capacity of such unit, conductive metal support rings each secured to a different one of said metal surfaces, and trimmer condenser means each mechanically and electrically connected to a spaced pair of support rings.

4. A circuit tuning unit comprising, in combination, an elongated tubular dielectric member, at least a pair of tubular conductive metal surfaces arranged in longitudinally spaced relation on the outer surface of said member, a conductive metal element mounted for relative axial movement in said member, means operatively connected to said element and constructed and arranged to effect such relative axial movement to vary the capacity of such unit, conductive metal support rings each secured to a different one of said metal surfaces, padder coil means each mechanically and electrically connected to a spaced pair of support rings, and trimmer condenser means each mechanically and electrically connected to a spaced pair of support rings.

5. A circuit tuning unit comprising, in combination, an elongated tubular dielectric member, at least a pair of tubular conductive metal surfaces arranged in longitudinally spaced relation on the outer surface of said member, a conductive metal element mounted for relative axial movement in said member, means operatively connected to said element and constructed and arranged to effect such relative axial movement to vary the capacity of such unit, and a mounting ring secured to said member near one end thereof and having a radial flange shaped to interlockingly engage a mounting washer surrounding an aperture in a mounting base arranged to receive said unit.

6. A circuit tuning unit comprising, in combination, an elongated tubular dielectric member, at least a pair of tubular conductive metal surfaces arranged in longitudinally spaced relation on the outer surface of said member, a conductive metal element mounted for relative axial movement in said member, means operatively connected to said element and constructed and arranged to effect such relative axial movement to vary the capacity of such unit, and a mounting ring secured to one of said metal surfaces near one end of said member and having a radial flange shaped to interlockingly engage a mounting washer surrounding an aperture in a mounting base arranged to receive said unit.

7. A tuner for a signal receiver constructed and arranged to receive signals in at least two substantially spaced frequency bands and having an R. F. amplifier section, an oscillator section and a mixer section for each band, said tuner comprising, in combination, a mounting base; a plurality of tuning units arranged in a pair of laterally spaced rows on said base, each unit comprising an elongated dielectric member, at least a pair of conductive metal surfaces arranged in longitudinally spaced relation on one surface of said member, and a conductive metal element mounted for relative movement longitudinally of said member adjacent the opposite surface of the latter, at least one unit being in tuning relation with each such receiver section, a pair of elongated relatively rigid elements each extending in alignment with one of such rows and substantially parallel to said base, and each movable in a plane substantially parallel to the elongation of said dielectric members; means connecting each conductive element to the adjacent elongated rigid element for conjoint movement of all the conductive elements in each row to conjointly vary the capacities of said units, and operating means mounted on said base and connected to said rigid elements and constructed and arranged to move said rigid elements in coordinated relation in such parallel planes.

8. A tuner for a signal receiver constructed and arranged to receive signals in at least two substantially spaced frequency bands and having an R. F. amplifier section, an oscillator section and a mixer section for each band, said turner comprising, in combination, a mounting base; a plurality of tuning units arranged in a pair of laterally spaced rows on said base, each unit comprising an elongated dielectric member, at least a pair of conductive metal surfaces arranged in longitudinally spaced relation on one surface of said member, and a conductive metal element mounted for relative movement longitudinally of said member adjacent the opposite surface of the latter; at least one unit being in tuning relation with each such receiver section, a pair of elongated relatively rigid elements each extending in alignment with one of such rows and substantially parallel to said base, and each movable in a plane substantially parallel to the elongation of said dielectric members; means connecting each conductive element to the adjacent elongated rigid element for conjoint movement of all the conductive elements in each row to conjointly vary the capacities of said units, operating means mounted on said base and connected to said rigid elements and constructed and arranged to move said rigid elements in coordinated relation in such parallel planes, a switch selectively operable to connect the receiver antenna and $B^+$ to each of the respective groups of sections of the receiver, and an operator connected to said operating means and operable, at selected relative positions of said rigid elements, to operate said switch to change the antenna and $B^+$ connections from one such group to another.

9. A tuner for a signal receiver constructed and arranged to receive signals in at least two substantially spaced frequency bands and having an R. F. amplifier section, an oscillator section and a mixer section for each band, said tuner comprising, in combination, a mounting base; a plurality of tuning units arranged in a pair of laterally spaced rows on said base, each unit comprising an elongated tubular dielectric member, at least a pair of tubular conductive metal surfaces arranged in longitudinally spaced relation on the outer surface of said member, and a conductive metal element mounted for relative axial movement in said member, at least one unit being in tuning relation with each such receiver section, a pair of elongated relatively rigid elements each extending in alignment with one of such rows and substantially parallel to said base, and each movable in a plane substantially parallel to the elongation of said dielectric members, means connecting each conductive element to the adjacent elongated rigid element for conjoint movement of all the conductive elements in each row to conjointly vary the capacities of said units, and operating means mounted on said base and connected to said rigid elements and constructed and arranged to move said rigid elements in coordinated relation in such parallel planes.

10. A tuner for a signal receiver constructed and arranged to receive signals in at least two substantially spaced frequency bands and having an R. F. amplifier section, an oscillator section and a mixer section for each band, said tuner comprising, in combination, a mounting base; a plurality of tuning units arranged in a pair of laterally spaced rows on said base, each unit comprising an elongated tubular dielectric member, at least a pair of tubular conductive metal surfaces arranged in longitudinally spaced relation on the outer surface of said member, and a conductive metal element mounted for relative axial movement in said member, at least one unit being in tuning relation with each such receiver section, a pair of elongated relatively rigid elements each extending in alignment with one of such rows and substantially parallel to said base, and each movable in a plane substantially parallel to the elongation of said dielectric members, means connecting each conductive element to the adjacent elongated rigid element for conjoint movement of all the conductive elements in each row to conjointly vary the capacities of said units, operating means mounted on said base and connected to said rigid elements and constructed and arranged to move said rigid elements in coordinated relation in such parallel planes, a switch selectively operable to connect the receiver antenna and $B^+$ to each of the respective group of sections of the receiver, and an operator connected to said operating means and operable, at selected relative positions of said rigid elements, to operate said switch to change the antenna and $B^+$ connections from one such group to another.

11. A tuner for a signal receiver constructed and arranged to receive signals in at least two substantially spaced frequency bands and having an R. F. amplifier section, an oscillator section and a mixer section for each band, said tuner comprising in combination, a mounting base; a plurality of tuning units arranged in a pair of laterally spaced rows on said base, each unit comprising an elongated tubular dielectric member, at least a pair of tubular conductive metal surfaces arranged in longitudinally spaced relation on the outer surface of said member, and a conductive metal element mounted for relative axial movement in said member, at least one unit being in tuning relation with each such receiver section, a pair of elongated relatively rigid elements each extending in alignment with one of such rows and substantially parallel to said base, and each movable in a plane substantially parallel to the elongation of said dielectric members, means connecting each conductive element to the adjacent elongated rigid element for conjoint movement of all the conductive elements in each row to conjointly vary the capacities of said units, a shaft removably mounted in a pair of end walls extending from the ends of said base, said shaft being rotatable and extending parallel to and substantially centrally of said base, a pair of circular members each secured to rotate with said shaft adjacent an end wall, a pair of endless flexible elements each trained over and secured to a circular member and each extending tangentially from the latter perpendicularly to said base and trained over idler means mounted on each end wall inwardly of said shaft, each rigid element being secured at each end to a tangential portion of one of said flexible elements, and operating means mounted on an end wall and connected to said shaft and constructed and arranged to oscillate said shaft to reversely reciprocate said rigid elements.

12. A tuner for a signal receiver constructed and arranged to receive signals in at least two substantially spaced frequency bands and having an R. F. amplifier section, an oscillator section and a mixer section for each band, said tuner comprising, in combination, a mounting base; a plurality of tuning units arranged in a pair of laterally spaced rows on said base, each unit comprising an elongated tubular dielectric member, at least a pair of tubular conductive metal surfaces arranged in longitudinally spaced relation on the outer surface of said member, and a conductive metal element mounted for relative axial movement in said member, at least one unit being in tuning relation with each such receiver section, a pair of elongated relatively rigid elements each extending in alignment with one of such rows and substantially parallel to said base, and each movable in a plane substantially parallel to the elongation of said dielectric members, means connecting each conductive element to the adjacent elongated rigid element for conjoint movement of all the conductive elements in each row to conjointly vary the capacities of said units, a shaft removably mounted in a pair of end walls extending from the ends of said base, said shaft being rotatable and extending parallel to and substantially centrally of said base, a pair of circular members each secured to rotate with said shaft adjacent an end wall, a pair of endless flexible elements each trained over and secured to a circular member and each extending tangentially from the latter perpendicularly to said base and trained over idler means mounted on each end wall inwardly of said shaft, each rigid element being secured at each end to a tangential portion of one of said flexible elements, operating means mounted on an end wall and connected to said shaft and constructed and arranged to oscillate said shaft to reversely reciprocate said rigid elements, a switch selectively operable to connect the receiver antenna and B+ to each of the respective groups of sections of the receiver, and an operator connected to said operating means and operable, at selected relative positions of said rigid elements, to operate said switch to change the antenna and B+ connections from one such group to another.

13. A tuner for a signal receiver constructed and arranged to receive signals in at least two substantially spaced frequency bands and having an R. F. amplifier section, an oscillator section and a mixer section for each band, said tuner comprising, in combination, a mounting base; a plurality of tuning units arranged in a pair of laterally spaced rows on said base, each unit comprising an elongated tubular dielectric member, at least a pair of tubular conductive metal surfaces arranged in longitudinally spaced relation on the outer surface of said member, and a conductive metal element mounted for relative axial movement in said member, at least one unit being in tuning relation with each such receiver section, a pair of elongated relatively rigid elements each extending in alignment with one of such rows and substantially parallel to said base, and each movable in a plane substantially parallel to the elongation of said dielectric members, means connecting each conductive element to the adjacent elongated rigid element for conjoint movement of all the conductive elements in each row to conjointly vary the capacities of said units, a shaft removably mounted in a pair of end walls extending from the ends of said base, said shaft being rotatable and extending parallel to and substantially centrally of said base, a pair of circular members each secured to rotate with said shaft adjacent an end wall, a pair of endless flexible elements each trained over and secured to a circular member and each extending tangentially from the latter perpendicularly to said base and trained over idler means mounted on each end wall inwardly of said shaft, each rigid element being secured at each end to a tangential portion of one of said flexible elements, an operating means rotatably mounted on an end wall and having an axis extending parallel to said shaft, a relatively short radius crank rotatable with said operating means, a relatively long radius crank secured to said shaft, and a link interconnecting said cranks, whereby rotation of said operating means will oscillate said shaft to reversely reciprocate said rigid elements.

14. A tuner for a signal receiver constructed and arranged to receive signals in at least two substantially spaced frequency bands and having an R. F. amplifier section, an oscillator section and a mixer section for each band, said tuner comprising, a combination, a mounting base; a plurality of tuning units arranged in a pair of laterally spaced rows on said base, each unit comprising an elongated tubular dielectric member, at least a pair of tubular conductive metal surfaces arranged in longitudinally spaced relation on the outer surface of said member, and a conductive metal element mounted for relative axial movement in said member, at least one unit being in tuning relation with each such receiver section, a pair of elongated relatively rigid elements each extending in alignment with one of such rows and substantially parallel to said base, and each movable in a plane substantially parallel to the elongation of said dielectric members, means connecting each conductive element to the adjacent elongated rigid element for conjoint movement of all the conductive elements in each row to conjointly vary the capacities of said units, a shaft removably mounted in a pair of end walls extending from the ends of said base, said shaft being rotatable and extending parallel to and substantially centrally of said base, a pair of circular members each secured to rotate with said shaft adjacent an end wall, a pair of endless flexible elements each trained over and secured to a circular member and each extending tangentially from the latter perpendicularly to said base and trained over idler means mounted on each end wall inwardly of said shaft, each rigid element being secured at each end to a tangential portion of one of said flexible elements, an operating means rotatably mounted on an end wall and having an axis extending parallel to said shaft, a relatively short radius crank rotatable with said operating means and formed as a cam, a relatively long radius crank secured to said shaft, a link interconnecting said cranks, whereby rotation of said operating means will oscillate said shaft to reversely reciprocate said rigid elements, and a switch selectively operable to connect the receiver antenna and B+ to each of the respective groups of sections of the receiver and having on operator engaged with such cam, said cam being shaped to move said operator, at selected relative positions of said rigid elements, to operate said switch to change the antenna and B+ connections from one such group to another.

WERNER F. AUERBACHER.
SEYMOUR NAPOLIN.

References Cited in the file of this patent

UNITED STATES PATENTS

| Number | Name | Date |
|---|---|---|
| 2,095,420 | Polydoroff | Oct. 12, 1937 |
| 2,338,134 | Sands et al. | Jan. 4, 1944 |
| 2,440,269 | Hargrove | Apr. 27, 1948 |
| 2,469,168 | Loughlin | May 3, 1949 |
| 2,540,824 | Kolks | Feb. 6, 1951 |
| 2,562,263 | Ehrlich | July 31, 1951 |